June 16, 1942. A. RONNING 2,286,576
VEHICLE SUSPENSION MECHANISM
Filed Jan. 27, 1941 2 Sheets-Sheet 1
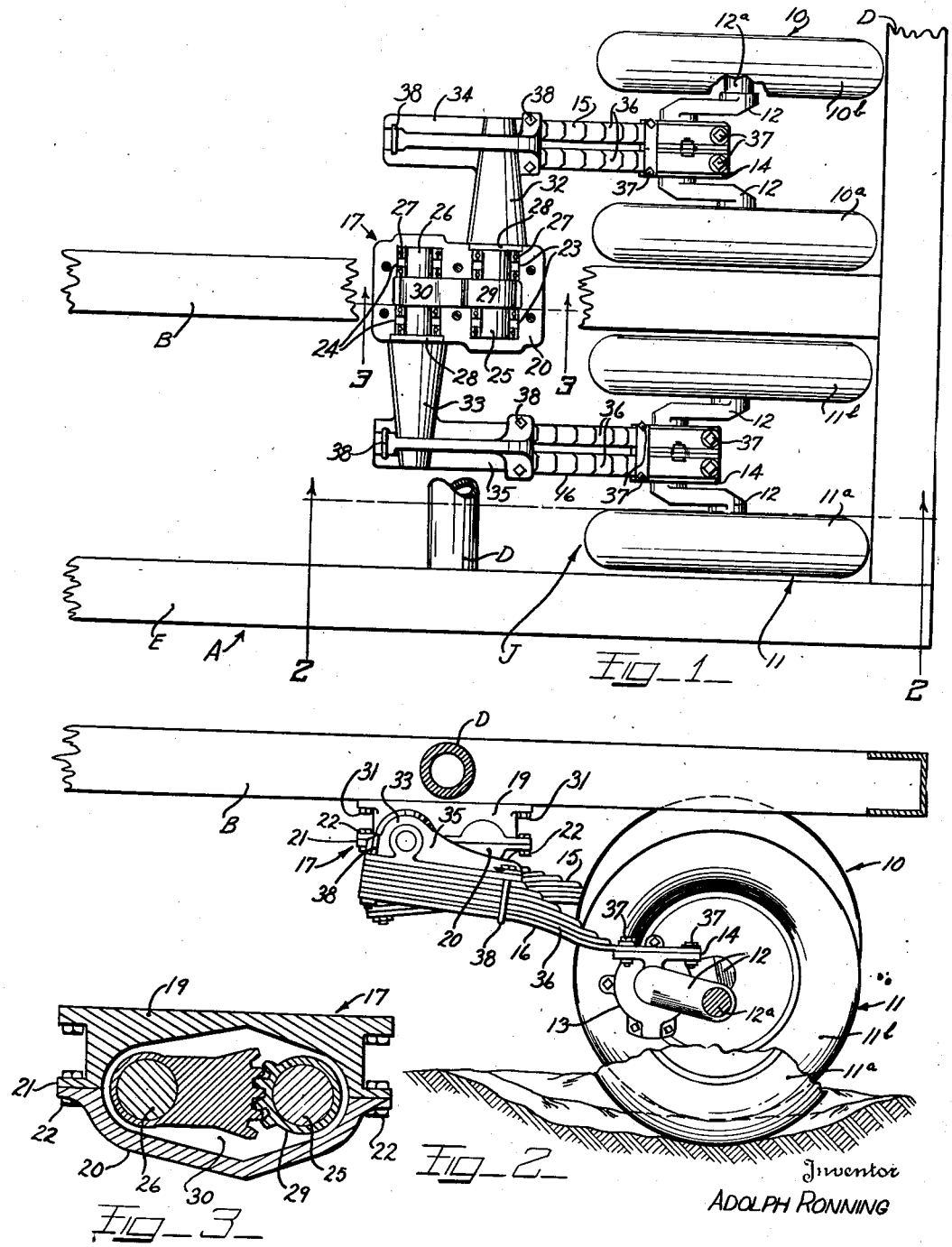
Inventor
ADOLPH RONNING
By Carlsen + Hagle
Attorneys

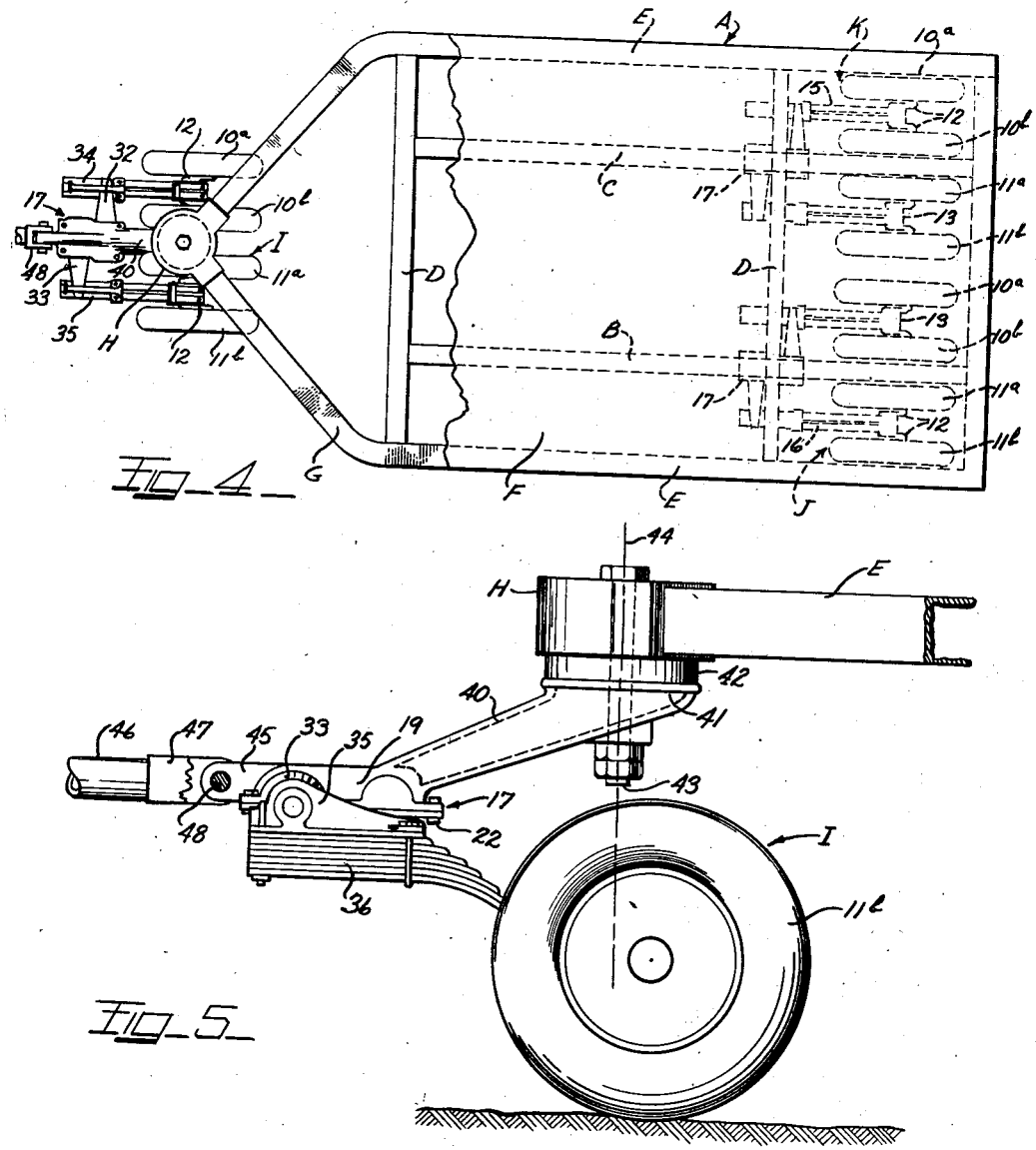

Patented June 16, 1942

2,286,576

UNITED STATES PATENT OFFICE 2,286,576

VEHICLE SUSPENSION MECHANISM

Adolph Ronning, Minneapolis, Minn.

Application January 27, 1941, Serial No. 376,163

2 Claims. (Cl. 280—104)

This invention relates to differential or compensating wheel suspension mechanism for land vehicles.

The primary object of the invention is to provide mechanism of this kind which is so constructed and arranged that it will permit travel of the several supporting wheels of a vehicle over irregular ground surfaces with a minimum of vertical movement of the supported parts of the vehicle, and with equal load distribution to all of the wheels at all times. Another object is to provide apparatus of this kind in which a plurality of pairs of wheels are supported to permit relative, differential movements in up and down directions in response to contact with uneven ground surfaces and with the individual wheels of each pair furthermore differentially connected for the same purpose and action. Still another object is to provide multiple or plural differential wheel mountings of this kind embodying also spring suspension for the wheels and providing for steering movements of such wheels as may be required.

These and other more detailed and specific objects will be disclosed in the course of the following specification, reference being had to the accompanying drawings, in which—

Fig. 1 is a plan view of a rear corner portion of a vehicle showing the same as equipped with plural differential and spring suspension for two pairs of ground wheels, there being certain parts of the vehicle frame broken away to better illustrate structural features of my invention.

Fig. 2 is a longitudinal vertical section along the line 2—2 on Fig. 1 showing a rear group of wheels with the outer or nearer pair individually differentially adjusted and the inner pair as elevated by differential adjustment relative to said outer pair.

Fig. 3 is an enlarged section along the line 3—3 in Fig. 1.

Fig. 4 is a plan view of a trailer type of vehicle equipped with three, four wheel groups, and with the forward group arranged for steering movements.

Fig. 5 is an enlarged side elevation of a forward portion of the trailer of Fig. 4 showing the steerable front wheel group.

Referring now to the drawings with more particularity and by reference character, A designates the frame of a vehicle, which is shown as of the trailer type, although as a matter of course my invention may be applied equally well to all types of vehicles such as trailers, automotive vehicles, bogies, gear carriages, road graders, implements and the like.

The frame A includes longitudinal main beams B and C connected at spaced points by rigid cross beams D and which support outwardly located and longitudinally extending side beams E. The frame may have any usual type of platform or superstructure F, and forwardly the beams B and C are goose-necked upwardly as represented at G in accordance with the usual practice in devices of this kind, and fore ends of the beams are joined by a rigid forward casting or nose member H.

In accordance with my invention the vehicle is supported by no less than twelve ground wheels arranged in three groups or assemblies, of four wheels each, and with said groups located in triangular formation. That is, a forward group, designated generally at I, is located beneath the goose-neck or "kick-up" G in a central position (transversely of the vehicle) while the remaining two groups, designated at J and K, are located at rear corners of the vehicle with the respective wheels normally in transverse axial alignment. As a result of this arrangement partially, but mainly due to my novel plural or multiple differential connections hereinafter described, the weight of the vehicle and its load is thus transmitted to the road at twelve points spaced over a large area to thus widely distribute load stresses and thereby greatly reduce the possibility of damaging the road surface.

Inasmuch as all three of the wheel groups, I, J, K, are substantially identical, only one will herein be described in detail and similar reference characters will then serve to indicate corresponding elements of the remaining groups.

Referring then to the left (looking forwardly) rear group J (Figs. 1 and 2) it will be seen that I provide two transversely spaced and substantially parallel right and left pairs of ground wheels 10 and 11 with the individual wheel 10a—10b and 11a—11b of each pair closely spaced and with said pairs located respectively equal distances inside and outside of the main frame beam B. The wheels 10a—10b and 11a—11b of the pairs are mounted on spindles 12a at the rear ends of crank arms 12 which at forward ends are journaled into housings 13 arranged between the respective wheels. The crank arms may thus swing in up and down directions at their wheel supported ends about the transverse axes on which they are journaled into the housings 13.

Within the housings 13 the crank arms 12 are differentially connected so that an up movement of one arm alongside either housing will be translated into an equal down movement of the other arm alongside that housing, to thus effect a differential or compensated upward and downward relative movement of the individual wheels of each pair. The type or exact construction of such differential connecting means forms no part of my present invention but for a disclosure of particularly suitable mechanisms reference is invited to my Patents 2,208,599, 2,208,600, 2,209,093, 2,209,094 and 2,209,095, all issued to me on July 23, 1940; my Patents 2,217,816 and 2,218,817, issued to me Oct. 15, 1940; my Patent 2,222,857, issued Nov. 26, 1940; my Reissue Patent 21,685, reissued Jan. 7, 1941; and my copending applications resulting in Patent 2,236,734 on April 1, 1941, Patent 2,244,853 on June 10, 1941, and Patent 2,254,451 on September 2, 1941.

The housings 13 each are provided with upper mounting plates or pads 14 to which are secured the rear ends of the main supporting arms or crank members designated generally at 15 and 16, and one of which is provided for each wheel pair 10 and 11. These members 15 and 16 extend forwardly from between the wheels of each pair alongside a main or center differential mechanism designated generally at 17. Said mechanism 17 is very similar in construction to that shown in my Patent No. 2,217,817 hereinbefore noted, although, here again the exact type of differential housing and connections is of no particular bearing on my present invention and thus such as shown in my identified patents and applications may be used.

The mechanism 17 comprises a housing E which serves as a bearing assembly and includes upper and lower sections 19 and 20 detachably fastened together along a medial, horizontal parting line 21 by bolts 22. Bearings 22—24 are formed on transverse axes in the opposite sides and meeting surfaces of the housing sections, and provided therein are the shafts 25 and 26 which extend laterally and oppositely from the housing toward the main crank members 15 and 16, respectively. Anti-friction devices 27 and oil seals 28 are provided in the bearings for the usual purposes. The shafts 25 and 26 are spaced apart longitudinally, or in forward and rearward directions and within the differential housing, connecting or rocker members constituted by meshing gears 29 and 30 are secured to the shafts as clearly shown in Figs. 1 and 3. The housing is rigidly mounted by means of bolts 31 to the beam B forwardly of the wheels.

The shafts 25—26 are the reduced rounded extensions of connecting or casting members 32—33 which extend outwardly in opposite directions from the differential and which at outer ends are formed with mounting plates or pads 34—35 extended in forward and rearward directions from the respective castings. The main crank members 15 and 16 are each made up of one, or more, quarter-elliptic laminated springs as represented at 36, and are here shown as each comprising two of such springs which at rear ends are clamped rigidly at 37 to the pads 14 atop the differential housings 13 of each wheel pair 10 and 11. Forward ends of the springs are then extended beneath the pads 34—35 and are rigidly clamped thereto by U-bolts 38, or similar fasteners.

In operation, the weight of that part of the vehicle A supported by the described wheel group J is transmitted through the connection between the beam B and the differential mechanism 17 to the main crank members 15 and 16 and thence to the differential mechanisms between the wheel pairs 10 and 11, reaching the individual wheels through the crank arms 12. Where the wheels travel over a plane surface all parts remain substantially in equilibrium except for such flexing movements as occur in the springs 36 and which provide spring suspension for the vehicle as will be apparent.

Now as either wheel pair 10 or 11 meets with a rise or depression in the road surface they will move upwardly or downwardly, as the case may be, swinging the associated crank members 15 or 16 in vertical, longitudinal planes about the journal axes in differential mechanism 17. The gear connections between the shafts 25—26 will translate such movements into equal but opposite movements of the other main crank member and it will be evident therefore that the wheel pairs may readily adjust themselves to irregularities in the road surface with a minimum of disturbance of the equilibrium of the vehicle itself and while at the same time maintaining equal load distribution to the wheels.

In addition there may at any time occur differential, compensating movements of the individual wheels 10a—10b and 11a—11b of each pair through the differential connections between the crank arm 17. These differential movements will of course compensate for irregularities in the road surface met by the individual wheels to further and greatly contribute to vehicle stability and equal load distribution to all wheels at all times. It is evident therefore that by the plural or multiple differential actions thus provided that all of the wheels may adjust themselves to the road surface as may be required and no matter how irregular such surface may be.

It will be noted that the springs 36 making up each main crank member 15 or 16 are of equal length and therefore interchangeable. Also such parts as the members 32 and 33, gears 29 and 30, and housing parts, are interchangeable with corresponding parts of other wheel groups. The effective lengths of the main crank members 15 and 16 are, however, different since they swing about the relatively spaced axes of the shafts 25 and 26. The difference in the radii of the arcs described by these members in their differential movements is however largely compensated for by a difference in the effective pitch diameters of the gears 29—30 as seen in Fig. 3, the larger gear being of course connected to the member 16 having the longer effective radius.

So far as structural details are concerned the other wheel groups J and K are identical as heretofore stated and all of the twelve wheels are thus arranged for differential adjustments both individually and in pairs. The forward group I is arranged for steering movements as will now be described it being understood, however, that I do not limit myself to such arrangement of the wheel groups or assemblies and that any member of such groups may be used as may be required to support the vehicle.

The housing of the differential mechanism 17 of this forward wheel group I has its upper section 19, provided with a rearwardly extending, rigid arm 40 which at a rear end carries a horizontally disposed turntable or fifth wheel 41 adapted to bear upwardly against a similar complementary member 42 beneath the nose casting H. A hinge bolt 43 is placed through these parts to thus support the arm 40 for angling adjustments in a horizontal plane and about an upright steering axis, as indicated at 44. As will be seen this axis line 44 falls slightly forwardly of the transverse axes of the wheels 10—11 of this forward group although, as a matter of fact, the steering axis may be arranged in the transverse vertical plane of the wheel axes or at any distance therefrom as may be desired. The angling adjustment of the arms 40 of course will bring about steering movements of the wheel group J as a whole to thus steer the entire vehicle. An apertured lug 45 is extended forwardly from the upper housing section 14 and a tubular tongue 46 connected thereto by means of a fork 47 and pivot or clevis pin 48 to thus serve as both a draft and steering connection for the vehicle.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a heavy duty vehicle, a frame, suspension mechanism for supporting the frame comprising four pairs of ground wheels all arranged in substantial axial alignment under the frame and with two pairs of such wheels under each side portion of the frame, a pair of primary differential mechanisms secured to the frame at transversely spaced points, equidistant from the center, so as to proportionately support the two sides of the frame, two support arms extending from each of said differential mechanisms and for swinging movements in opposite vertical directions through differential action of the mechanism, a series of secondary differential mechanisms, one secured to each of said arms, each of said secondary differential mechanisms being supported by one of said wheel pairs and operative to translate up movement of one wheel of the pair to a down movement of the other wheel of the same pair.

2. In a heavy duty vehicle, a frame, suspension mechanism for supporting the frame comprising four pairs of ground wheels all arranged in substantial axial alignment under the frame and with two pairs of such wheels under each side portion of the frame, a pair of primary differential mechanisms secured to the frame at transversely spaced points, equidistant from the center, so as to proportionately support the two sides of the frame, two support arms extending from each of said differential mechanisms and for swinging movements in opposite vertical directions through differential action of the mechanism, a series of secondary differential mechanisms, one secured to each of said arms, each of said secondary differential mechanisms being supported by one of said wheel pairs and operative to translate up movement of one wheel of the pair to a down movement of the other wheel of the same pair, said support arms being formed of spring material to thereby cushion the vertical movements of all the wheels with respect to the vehicle frame.

ADOLPH RONNING.